(No Model.)
L. W. OSTER.
NURSING BOTTLE.
No. 395,992. Patented Jan. 8, 1889.
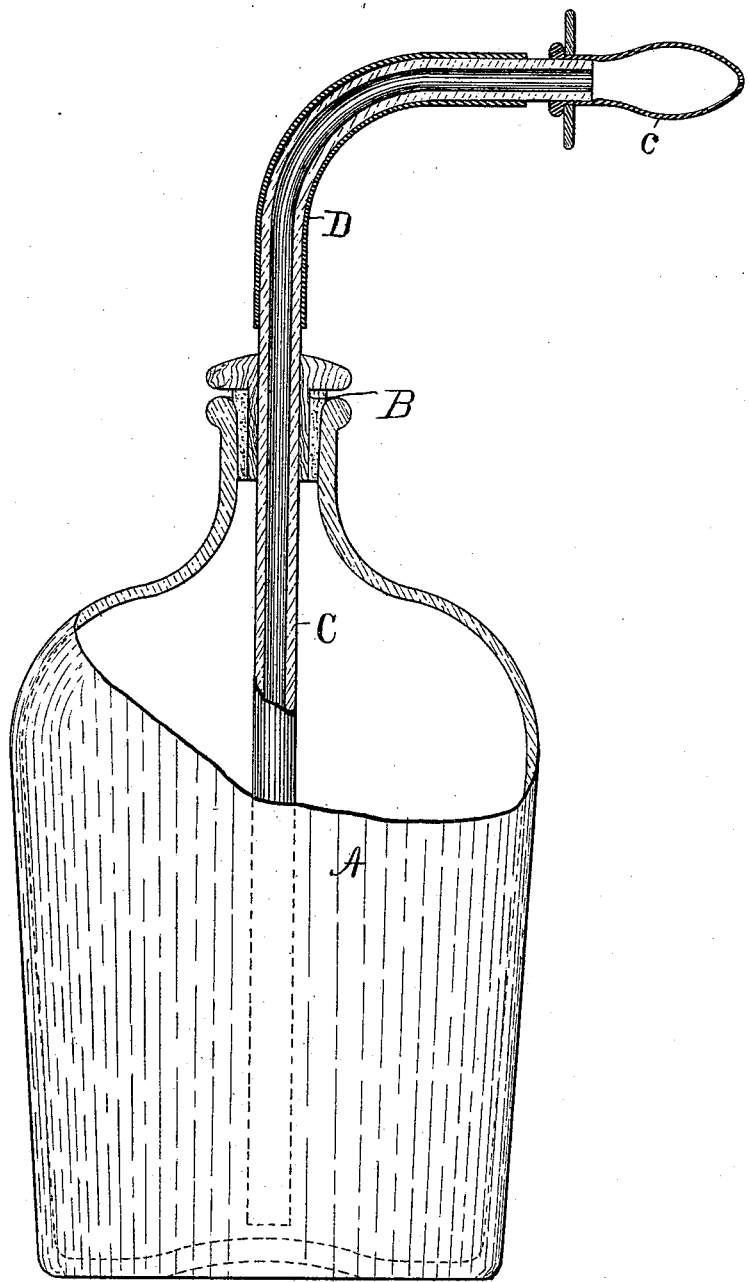
WITNESSES,
INVENTOR.

UNITED STATES PATENT OFFICE.

LOUIS W. OSTER, OF CLEVELAND, OHIO.

NURSING-BOTTLE.

SPECIFICATION forming part of Letters Patent No. 395,992, dated January 8, 1889.

Application filed August 14, 1888. Serial No. 282,748. (No model.)

*To all whom it may concern:*

Be it known that I, LOUIS W. OSTER, a citizen of the United States, residing at Cleveland, in the county of Cuyahoga and State of Ohio, have invented certain new and useful Improvements in Nursing-Bottles, of which the following is a full, clear, and exact description, reference being had to the accompanying drawing, in which the figure is a front view of my improved device shown partly in section.

Most nursing-bottles now in use are provided with a tube through which the milk is drawn, which is formed wholly or in part of hard or soft rubber. In such bottles the milk will, especially when the tube is new, have a slight taste of the rubber. Moreover, the rubber tubes are hard to wash clean, and unless the greatest care is taken some of the milk is apt to adhere thereto and become sour and taint the fresh milk. These are very objectionable features, because it is extremely dangerous to give to an infant anything but the purest food.
In my device the tube through which the milk is drawn is made entirely of glass, which is not only easy to clean, but it is also easy to see when it is clean.

In the drawing, A represents the bottle or other receptacle, and B the stopper through which is passed the glass tube C. This tube is bent outside the stopper, substantially at right angles to the main part of the tube, so that the infant can put the nipple c in his mouth while the bottle is held upright. In bending the tube the glass becomes weakened at the bend, so that it will have no durability unless protected. A very slight strain or blow would cause it to break. To prevent this, I place a tight-fitting rubber tube, D, around that part of said glass tube outside the bottle. This greatly strengthens the bent tube, so that it will stand some hard blows without danger of breaking, and renders it as strong and durable as is necessary. This rubber tube does not come in contact with the milk and is not open to the objections hereinbefore pointed out.

Having thus described my invention, what I claim as new, and desire to secure by Letters Patent, is—

The combination of a bottle or other receptacle and a stopper with a glass tube passing through said stopper, the part of said tube outside the bottle being bent substantially at right angles to the other part thereof, a nipple, and a tight-fitting rubber tube surrounding the bent part of said glass tube, substantially as and for the purpose specified.

LOUIS W. OSTER.

Witnesses:
E. L. THURSTON,
FRANK. MILLER.